United States Patent [19]

Colliopoulos

[11] Patent Number: 5,009,916

[45] Date of Patent: Apr. 23, 1991

[54] PSYLLIUM MUCILLOID FIBER FOOD PRODUCTS

[75] Inventor: John A. Colliopoulos, Evanston, Ill.

[73] Assignee: The Procter & Gamble Company, Cincinnati, Ohio

[21] Appl. No.: 763,118

[22] Filed: Aug. 7, 1985

Related U.S. Application Data

[63] Continuation-in-part of Ser. No. 677,633, Dec. 3, 1984, abandoned, which is a continuation-in-part of Ser. No. 542,450, Oct. 17, 1983, abandoned, which is a continuation-in-part of Ser. No. 560,720, Dec. 12, 1983, abandoned.

[51] Int. Cl.$^5$ .................... A23L 1/526; A23L 1/308; A23P 1/14
[52] U.S. Cl. ..................... 426/615; 426/445; 426/629; 426/548; 426/549; 426/808; 426/804; 424/195.1
[58] Field of Search ............... 426/590, 615, 629, 548, 426/804, 808, 549; 814/782, 783, 892; 424/195.1

[56] References Cited

U.S. PATENT DOCUMENTS

| Re. 32,811 | 12/1988 | Rudin | 424/195.1 |
|---|---|---|---|
| 2,060,336 | 4/1933 | Near et al. | 424/195.1 |
| 4,089,981 | 5/1978 | Richardson | 426/104 |
| 4,156,021 | 5/1979 | Richardson | 426/104 |
| 4,321,263 | 3/1982 | Powell et al. | 424/195.1 |
| 4,459,280 | 7/1984 | Colliopoulos et al. | 424/35 |
| 4,548,806 | 10/1985 | Colliopoulos et al. | 424/35 |
| 4,551,331 | 11/1985 | Rudin | 424/195.1 |
| 4,565,702 | 1/1986 | Morley et al. | 426/93 |

FOREIGN PATENT DOCUMENTS

| 105195 | 4/1984 | European Pat. Off. . |
| 2430509 | 1/1976 | Fed. Rep. of Germany . |
| 80/00658 | 4/1980 | PCT Int'l Appl. . |
| 1590507 | 6/1981 | United Kingdom . |
| 2067402 | 7/1981 | United Kingdom . |

*Primary Examiner*—Jacqueline Stone
*Attorney, Agent, or Firm*—Kim William Zerby; Douglas C. Mohl; Richard C. Witte

[57] ABSTRACT

This disclosure relates to a novel composition for making and using psyllium high fiber food products useful as a dietary aid. In particular, the compositions contain a dry blend of high fiber food product base which may be incorporated into a psyllium fiber drink mix or extended psyllium fiber bar or puff.

10 Claims, No Drawings

PSYLLIUM MUCILLOID FIBER FOOD PRODUCTS

This is a continuation-in-part of application Ser. No. 677,633, filed on Dec. 3, 1984, now abandoned, which is a continuation-in-part of application Ser. No. 560,720, filed on Dec. 12, 1983, now abandoned, which is a continuation-in-part of application Ser. No. 542,450, filed on Oct. 17, 1983, now abandoned.

The present invention relates to a novel composition and method of making and using psyllium high fiber food products useful as a dietary aid in the control of constipation and/or as a dietary aid in weight loss and maintenance. In its composition aspect, it relates to a novel dry blend or agglomerated composition comprising psyllium mucilloid of at least 5-99 weight percent, total dietary fiber of from 4 to 100 weight percent from a grain, fruit or vegetable source (preferably from about 0 to 93 weight percent of this total dietary fiber being from a grain source) wherein the psyllium is a part of the dietary fiber. The dry blend or high fiber food product base is incorporated into suitable compositions to provide psyllium high fiber drink mix and extruded psyllium high fiber bars or puffs which may additionally contain optional sweeteners, flavoring agents, preservatives and the like. In its method aspect, it relates to novel processes comprising blending or agglomerating the novel composition, then adding water as necessary to form a drink which can be used as a dietary aid or to control constipation, or extruding at a temperature of between about 130° and 200° C. such that the final product has a psyllium content of between 10 to 80 weight percent to form a high fiber bar or puff.

Psyllium mucilloid consists of the mucillaginous portion (the husk either milled or unmilled) of blond psyllium seeds. Psyllium mucilloid contains natural mucillage and normally forms a gelatinous mass on contact with water. It is useful in the treatment of constipation by acting as a fecal softener and also as a demulcent in the presence of inflamed mucosa. Psyllium mucilloid exhibits poor disperability and mixability in water. The numerous individual particles tend to agglomerate when psyllium mucilloid is mixed with water. Hydration takes place over the surface of such agglomerated aggregates to form gel-coated lumps, the interiors of which are still substantially dry, and these lumps are extremely difficult to disperse. This effect is aggravated by the fact that psyllium has a tendency to float on the surface of the water, allowing partially dissolved particles to agglomerate into large masses. In addition, the taste of psyllium mucilloid is unacceptable to many persons.

Diets high in fiber have become increasingly more significant in American diets. Typical of the foods consumed are high fiber breads, whole grains and granolas, granola bars, etc. Diets high in fiber are important because they can be an adjunct to a weight loss program, and in addition, the roughage of high fiber aids in decreasing constipation.

While granola and other high fiber bars are attractive because of their portability, they are relatively high in fats used as adhesive agents and therefore high in calories. A "granola" bar supplying 3 grams of dietary fiber would contain 125-150 calories.

Attempts to make a fiber bar that is an expanded type product like a cracker without high caloric content have been largely unsuccessful. The fiber products such as soy bran, corn bran, wheat bran or rice bran work against the expanders needed for the proper amount of "puff" in a cracker-type product or cereal type puff. Psyllium, while also a dietary fiber, has largely been avoided due to its mucillaginous nature and the need to add water to most extruded products.

It is therefore an object of this invention to provide psyllium high fiber food products, specifically psyllium high fiber bars, puffs and drinks, and methods of making same, which are relatively low in calories and a useful adjunct in the control of weight gain and constipation. A further object of this invention is to provide psyllium high fiber foods products which will, in addition, aid to curb the appetite.

Accordingly, it has been discovered that an expanded high fiber bar or puff can be made comprising at least 5 to about 80 weight percent psyllium mucilloid, water, 0 to 69 (preferably 0 to 30) weight percent of an expander, and total dietary fibers of from 4 to 80 weight percent wherein the psyllium mucilloid may be a part of the dietary fiber. Optionally, one could add sweeteners, preferably from 0 to 30 weight percent, flavoring agents, preferably from about 3 to 5 weight percent, and a protein source, preferably from about 0 to 20 weight percent, the critical and novel portion of the invention being the addition of psyllium within a defined range to obtain an expanded fiber bar product. Without the psyllium, the fiber bar or puff will not expand and no "puffed" cracker-type product is possible. It has been suprisingly found that the mucillaginous properties of psyllium are not a problem within the given range when water is added in the extrusion process.

It has also been discovered that a psyllium high fiber drink mix can be made by dry blending or agglomerating, a base comprising at least 5 to 99 weight percent psyllium mucilloid, and total dietary fibers of from 4 to 100 weight percent wherein psyllium mucilloid may be a part of the dietary fiber and dietary fibers other than psyllium constitute at least 5 weight percent. Optionally, one could add sweeteners, preferably from about 0 to 60 weight percent, flavoring agents, preferably from about 0 to 7 weight, a protein source, binders, wetting agents, surfactants or the like, preferably from about 0 to 20 weight percent, the critical and novel portion of the invention being the addition of psyllium with a blend of dietary fibers with at least 11 weight percent psyllium to obtain a wettable, disperable high fiber drink product. Without the psyllium mucilloid, the other fiber(s) will not wet or disperse well nor have the desired pharmaceutical effect. It has been surprisingly found that the mucillaginous agglomerated particles do not form gel coated lumps within the given range of the invention without the addition of sucrose while retaining acceptable taste and remaining relatively low in calories. The dry blended or agglomerated base may be employed as an intermediate in the preparation of the high fiber bars or puffs of this invention.

Dietary fibers are naturally occurring in grains, cereals, fruits and vegetables. They can be classified as cellulose, hemicellulose, lignin, gums or pectins. Examples of dietary fibers are soy bran, corn bran, wheat bran, rice bran, psyllium, carrageenan, the known gums and pectins. The most preferred dietary fibers are the cereal brans and while these normally tend to work against expansion, that is not the case when psyllium is used. Since psyllium itself is a dietary fiber, it is possible to make the food products of this invention using only psyllium as the dietary fiber source. However, a combination of dietary fibers is most preferred.

Expanders are those substances which under proper conditions one skilled in the art can make an extruded product puff of expand into airy crackers such as saltines, etc. Examples of expanders are rice flour, corn flour, wheat flour and modified starches.

Optional protein sources are animal or vegetable protein such as soy protein isolate, which is 95% protein or milk protein. Sweeteners can be the naturally occurring sweeteners such as sucrose or fructose or the artificially made sweeteners such as saccharin, acetosulfame, cyclamate and aspartame. Flavoring agents can be chosen from a wide variety of agents known to those skilled in the art, for example, apple-cinnamon, peanut butter, granola, etc.

Wetting agents and solubilizing agents can be added to further improve the compositions. Examples of suitable wetting agents and solubilizing agents are polysorbate 60 and sodium lauryl sulfate.

The bars and puffs of the present invention are manufactured by mixing the ingredients, except the water, and then blending for about 15 to 30 minutes until the mixture is fairly homogeneous. Optionally, ingredients which are added in small amounts (e.g., aspartame) could be premixed with, for example, the expander, in order to insure more uniform mixing. The mixture is then fed to an extruder of the type used by one skilled in the art for making an expanded cracker-type product with a water feed and extruded at from about 130° to about 200° C. (preferably from about 150° to about 200° C.) using techniques known in the art. The cracker may then be cut to the appropriate size and packaged for sale. A preferred cracker would contain from 3-6 grams of dietary fiber per bar. This cracker would contain approximately 11 calories. A high fiber breakfast cereal type puff is made in like manner as the bar except that smaller pieces are made. In general the size and weight would be similar in size to what one skilled in the art would use for non-high fiber "beakfast cereal" type puffs.

The high fiber drink composition of the present invention is manufactured by either dry blending the ingredients or coating the dry blended ingredients with a suitable water soluble material such as gums, cellulose derivative, hydrolyzed starch oligosaccharide, mono or disaccharide, a polyglucose or a polymaltose to form an agglomerate by methods well known to one skilled in the art wherein said agglomerate product may be up to 0-20 weight percent of the above water soluble materials. The product may then be mixed with water to form a "drink" as needed. In general, a preferred single dose for laxative purposes or dietary aid would be such that about 3.2-3.7 grams of psyllium and 1.0-6.0 grams of the fibers are delivered.

These high fiber food products have several utilities. First, in a weight control program there is a dual action to the crackers or puffs and drinks. This dual action consists of the intake of caloric fiber which aids in the saliation of appetite yet provides little caloric intake and the mucilaginous psyllium which expands in the stomach and will tend to give a "full" feeling. Second, because of the laxative action of both psyllium and dietary fibers in general, the bars and drinks may be used as roughage to decrease occurrences of constipation. Thirdly, because a variety of dietary fibers can be used, a well balanced supplement of dietary fibers (soluble and insoluble) may be made. In addition, the dry blend mix is useful as an intermediate in making the agglomerated product and the fiber bar.

The invention will appear more fully from the examples which follow. These examples are given by way of illustration only, and are not to be construed as limiting the invention either in scope or in spirit, as many modifications will be apparent from the disclosure to those skilled in the art.

EXAMPLE 1—APPLE-CINNAMON FLAVOR FIBER BARS

The following materials were mixed about 15-20 minutes until well blended in a ribbon blender. Samples are taken from different areas of the blender to insure uniform mixing.

| COMPONENT | AMOUNT PER DOSE (g) | AMOUNT PER BATCH (Kg) |
|---|---|---|
| Refined Corn Bran G-Fine | 1.4175 | 157.50 |
| Sized Mucilloid | 1.3950 | 155.00 |
| Sucrose, NF | 1.3500 | 150.00 |
| Fructose, USP | 1.3500 | 150.00 |
| Yellow Corn Cones | 1.1700 | 130.00 |
| Soy Protein Isolate (Profam S-955) | 0.6750 | 75.00 |
| Rice Flour | 0.4500 | 50.00 |
| Apple Durarome Natural Flavor | 0.2250 | 25.00 |
| Rice Bran (Protex 40) | 0.1800 | 20.00 |
| Oleoresin Cinnamon Durarome | 0.1800 | 20.00 |
| Ground Korintji Cinnamon | 0.1800 | 20.00 |
| Wheat Bran | 0.1575 | 17.50 |
| Avicel pH 101 | 0.1350 | 15.00 |
| Citrus Pectin, Jet-Sol #3454 | 0.0450 | 5.00 |
| Guar Gum Pretested 8/20 C Powder | 0.0450 | 5.00 |
| Locust Bean Gum Pretested POR/A Powder | 0.0450 | 5.00 |
| | 9.0000 g | 1000.00 Kg |

The mixture is then extruded using a Creusot-Loire Model BC 72 using a central feed plate with a brass die, a stainless steel die or other metal may also be used (38 mm ×2 mm) and metal die calibrator with teflon liners and with a metal calibrator space of 1/16 inch or central feed plate with two slots (dies) may also be used. Water was fed at 150 ml/min. and the extruder at 1500 psi with a mixture feed rate of 1.686 kg/m. Barrel temperature was 188° C. Screw speed was 150 RPM. Wafers were cut to 9 grams in size using a Leroy Savor Model MVS-50 cutter. These bars contain 3 grams of dietary fiber and have a caloric content of 24.

EXAMPLE 2—PEANUT FLAVOR FIBER BAR

| COMPONENT | AMOUNT PER DOSE (g) | AMOUNT PER BATCH (Kg) |
|---|---|---|
| Sized Mucilloid | 2.125 | 236.11 |
| Fructose, USP | 1.250 | 138.89 |
| Sucrose, NF | 1.250 | 138.89 |
| Yellow Corn Cones | 1.125 | 125.00 |
| Refined Corn Bran G-Fine | 0.910 | 101.11 |
| Rice Flour | 0.720 | 80.00 |
| Soy Protein Isolate (Profam S-955) | 0.675 | 75.00 |
| Natural Peanut Flavor #70000 | 0.450 | 50.00 |
| Rice Bran (Protex 40) | 0.225 | 25.00 |
| Avicel pH 101 | 0.135 | 15.00 |
| Citrus Pectin, Jet Sol #3454 | 0.045 | 5.00 |
| Guar Gum Pretested 8/20 C Powder | 0.045 | 5.00 |
| Locust Bean Gum | 0.045 | 5.00 |

| COMPONENT | AMOUNT PER DOSE (g) | AMOUNT PER BATCH (Kg) |
|---|---|---|
| Pretested POR/A Powder | 9.000 g | 1000.00 Kg |

EXAMPLE 3—GRANOLA FIBER BAR

Using the method of Example 1, the following mixture was made into 9 gram granola fiber bars.

| COMPONENT | AMOUNT PER DOSE (g) | AMOUNT PER BATCH (Kg) |
|---|---|---|
| Sized Mucilloid | 2.0070 | 223.00 |
| Brownulated Powdered Sugar | 1.3500 | 150.00 |
| Fructose, USP | 1.3500 | 150.00 |
| Yellow Corn Cones | 0.9630 | 107.00 |
| Rice Flour | 0.9000 | 100.00 |
| Soy Protein Isolate (Profam S-955) | 0.7200 | 80.00 |
| Refined Corn Bran G-Fine | 0.7200 | 80.00 |
| Granola-100% Natural Cereal | 0.4500 | 50.00 |
| Avicel pH 101 | 0.1350 | 15.00 |
| Natural Vanilla Malt Flavor FX #502 | 0.1350 | 15.00 |
| Rice Bran (Protex 40) | 0.1350 | 15.00 |
| Citrus Pectin, Jet-Sol #3454 | 0.0450 | 5.00 |
| Guar Gum Pretested 8/20 C Powder | 0.0450 | 5.00 |
| Locust Bean Gum | 0.0450 | 5.00 |
| Pretested POR/A Powder | 9.000 g | 1000.00 Kg |

EXAMPLE 4—WHOLE GRAIN FIBER BARS

Using the method of Example 1, the following mixture was made into 6 g whole grain flavor fiber bars.

| COMPONENT | AMOUNT PER DOSE (g) | AMOUNT PER BATCH (Kg) |
|---|---|---|
| Yellow Corn Cones | 1.0800 | 180.00 |
| Sized Mucilloid | 1.0500 | 175.00 |
| Rice Flour | 0.9000 | 150.00 |
| Refined Corn Bran G-Fine | 0.6000 | 100.00 |
| Rice Bran (Protex 40) | 0.6000 | 100.00 |
| Soy Protein Isolate (Profam S-955) | 0.6000 | 100.00 |
| Oat Flour | 0.3150 | 52.50 |
| Wheat Bran | 0.1800 | 30.00 |
| Salt, Sifto-50 | 0.1350 | 22.50 |
| Hard Wheat Flour | 0.1080 | 18.00 |
| Soft Wheat Flour | 0.1080 | 18.00 |
| Avicel pH 101 | 0.0900 | 15.00 |
| Brownulated Powdered Sugar | 0.0750 | 12.50 |
| Toasted Oat Flavor S-3624 MWN 1-TS | 0.0690 | 11.50 |
| Citrus Pectin, Jet-Sol #3454 | 0.0690 | 5.00 |
| Guar Gum Pretested 8/20 C Powder | 0.0300 | 5.00 |
| Locust Bean Gum | 0.0300 | 5.00 |
| Pretested POR/A Powder | 6.000 g | 1000.00 Kg |

One six gram wafer contains 2 grams of dietary fiber and 14 calories.

EXAMPLE 5—APPLE-CINNAMON "BREAKFAST CEREAL" TYPE PUFFS

Using the method of Example 1 but using 2 stainless steel dies each with 2 round holes (diameter 3/16"), the following mixture was made into high fiber breakfast cereal type puffs. Each puff weights 7 grams and contains approximately 13 calories.

| COMPONENT | Per 7 gm of Serving |
|---|---|
| Psyllium Mucilloid (Searle) | 3.500 g |
| Corn Meal (Yellow corn cones) | 1.085 g |
| Soy Protein Isolate (Profam S-955) | 0.840 g |
| Food Starch (Bakasnak) | 0.700 g |
| White Rice Flour | 0.476 g |
| Natural Apple Flavor (Durarome) | 0.105 g |
| Oleo Cinnamon (Durarome) | 0.105 g |
| Ground Korintji Cinnamon (McCormick) | 0.091 g |
| Partially Hydrogenated Vegetable Oil (Durkex 500) | 0.049 g |
| Aspartame (SEarle) | 0.035 g |
| Lecitreme-3527 (Beatrice) | 0.014 g |

EXAMPLE 6—CHOCOLATE FIBER HIGH FIBER BASE

The following mixture was dry blended in a Hobart blender:

| | Amt/Batch | Amt/Dose | % |
|---|---|---|---|
| Psyllium mucilloid | 41.97 g | 3.5 g | 20.98 |
| Corn bran | 20.38 g | 1.7 g | 10.92 |
| N.F. Milk Solids | 59.95 g | 5.0 g | 29.98 |
| Sweet Whey | 23.98 g | 2.0 g | 11.99 |
| Lecithinated Cocoa | 29.98 g | 2.0 g | 14.99 |
| Carob Magna | 11.99 g | 1.0 g | 5.99 |
| Aspartmae | 0.96 g | 0.08 | 0.48 |
| Dariloid | 4.80 g | 0.4 g | 2.40 |
| Locust Bean Gum | 6.00 g | 0.5 g | 2.99 |

An individual dose is 16.68 g which can be mixed with 8 ox of water to form a psyllium high fiber drink with a milk chocolate flavor.

EXAMPLE 7

The dry blend mixture of Example 1 was agglomerated using 7.7% maltodextrin as a coating agent in a Freund Agglomerator to give a dose of 17.96 g which is dissolved and dispersed readily in 8 oz of water.

EXAMPLE 8—ORANGE FLAVOR HIGH FIBER DRINK BASE

The following mixture is dry blended in a Hobart blender and used dry as an intermediate to a spray agglomerated product with 17.7 g Maltrin M-100 in 175 ml of water:

| | Amt/Batch | Amt/Dose | % |
|---|---|---|---|
| Psyllium | 175.00 g | 3.5 g | 50.00 |
| Rice Bran | 145.74 | 2.9 | 41.64 |
| Citric acid | 17.50 | 0.35 | 5.00 |
| Orange Flavor | 10.71 | 0.21 | 3.06 |
| Saccharin | .77 | 0.015 | 0.22 |
| Yellow #6 | .35 | 0.007 | 0.11 |

EXAMPLE 9

The following powder is prepared for use as a powdered drink mix and as an intermediate to a spray agglomerated product.

|  | Amt/Batch | Amt/Dose | % |
| --- | --- | --- | --- |
| Psyllium | 268.00 g | 3.4 g | 66.0 |
| Corn Bran | 125.60 | 1.6 | 31.5 |
| Aspartame | 6.4 | 0.08 | 1.6 |

What is claimed is:

1. An expanded high fiber bar or puff made by aqueous extrusion comprising about 5 to 80 weight percent of psyllium mucilloid, water, about 0 to 30 weight percent expander, and a total dietary fiber of from about 4 to 80 weight percent wherein the psyllium mucilloid may be a part of the dietary fiber, and wherein further said high fiber bar or puff comprises one or more dietary fibers selected from cereal brans.

2. An expanded high fiber bar or puff according to claim 1 comprising psyllium and one or more dietary fibers selected from the group consisting of corn bran, wheat bran, and rice bran.

3. An extruded high fiber, psyllium-containing product comprising:
   (a) from about 5 to about 50 weight percent of psyllium mucilloid;
   (b) from about 4 to about 80 weight percent total dietary fibers comprising psyllium fiber and cereal bran;
   (c) from about 0.5 to about 30 weight percent of a sweetening agent;
and wherein further said product is produced by hot extrusion with water.

4. An extruded high fiber, psyllium-containing product according to claim 3 wherein further said product comprises from about 5 to about 30 weight percent of an expander.

5. An extruded high fiber, psyllium-containing product comprising:
   (a) from about 5 to about 15 weight percent of psyllium mucilloid;
   (b) from about 4 to about 33 weight percent total dietary fibers comprising psyllium fiber and cereal bran;
   (c) from about 5 to about 30 weight percent of an expander selected from the group consisting of rice flour, corn flour, wheat flour, modified starches, and mixtures thereof; and
   (d) from about 0.5 to about 30 weight percent of a sweetening agent;
and wherein further said product is produced by hot extrusion with water.

6. An extruded high fiber, psyllium-containing product according to claim 5 wherein the expander comprises rice flour.

7. An extruded high fiber, psyllium-containing product according to claim 5 wherein the total dietary fibers comprise wheat bran.

8. A method of making an expanded high fiber bar or puff comprising making a mixture comprising psyllium mucilloid, 0 to 69 weight percent of an expander and a total dietary fiber from a grain source of from about 0 to 93 weight percent wherein the psyllium may be a part of the dietary fiber, blending the mixture until substantially homogeneous and then extruding with water at a temperature of from about 130° to 200° C. such that the final product has a psyllium content of between 5 to 99 weight percent, and wherein the dietary fiber comprises psyllium and one or more dietary fibers from a grain source selected from the group consisting of corn bran, wheat bran, and rice bran.

9. An extrusion process for preparing high fiber, psyllium-containing products, said process comprising the steps of:
   (a) blending until substantially homogeneous a mixture comprising from about 5 to about 15 weight percent of psyllium mucilloid, from about 4 to about 33 weight percent total dietary fibers comprising psyllium fiber and cereal bran, from about 5 to about 30 weight percent of an expander selected from the group consisting of rice flour, corn flour, wheat flour, modified starches, and mixtures thereof, and, optionally, from about 0.5 to about 30 weight percent of a sweetening agent; and
   (b) extruding with water at a temperature of from about 130° to 200° C.

10. An extrusion process for preparing high fiber, psyllium-containing products according to claim 9, said process comprising in step (a) blending a mixture comprising psyllium mucilloid, wheat bran, rice flour, and sweetening agent.

* * * * *